US006945729B2

(12) United States Patent
Yasuda

(10) Patent No.: US 6,945,729 B2
(45) Date of Patent: Sep. 20, 2005

(54) STRUCTURE FOR FASTENING BY SCREW

(75) Inventor: Yuji Yasuda, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 10/660,680

(22) Filed: Sep. 12, 2003

(65) Prior Publication Data

US 2004/0126184 A1 Jul. 1, 2004

(30) Foreign Application Priority Data

Sep. 12, 2002 (JP) ....................................... 2002-266964
Jul. 30, 2003 (JP) ....................................... 2003-203482

(51) Int. Cl.[7] .................................................. H01R 9/10

(52) U.S. Cl. .................... 403/408.1; 411/386; 411/412; 411/413; 411/387.1

(58) Field of Search ....................... 403/408.1; 411/386, 411/387.1–387.6, 412, 413

(56) References Cited

U.S. PATENT DOCUMENTS 4,174,148 A * 11/1979 Obuch et al. ............... 439/782
4,189,763 A 2/1980 Suzuki et al.
4,572,658 A 2/1986 Suzuki et al.
4,747,033 A 5/1988 Yasuda
4,782,369 A 11/1988 Yasuda et al.
4,891,739 A 1/1990 Yasuda
4,906,081 A 3/1990 Yasuda
4,949,120 A 8/1990 Yasuda et al.
5,057,863 A 10/1991 Yasuda
5,166,704 A 11/1992 Yasuda
5,280,362 A 1/1994 Noguchi et al.
5,309,182 A 5/1994 Mama et al.
5,355,153 A 10/1994 Yasuda
5,376,994 A 12/1994 Mama et al.
6,164,684 A * 12/2000 Lehman ............... 403/408.1 X
6,467,990 B1 * 10/2002 Kremsler et al. ........ 403/408.1

FOREIGN PATENT DOCUMENTS

| | | |
|---|---|---|
| DE | 37 36 364 | 9/1988 |
| DE | 37 26 405 | 2/1989 |
| GB | 1 249 725 | 10/1971 |
| JP | 6-25564 | 4/1994 |
| JP | 10-141342 | 5/1998 |

* cited by examiner

*Primary Examiner*—John R. Cottingham
(74) *Attorney, Agent, or Firm*—Oblon, Spivak, McClelland, Maier & Neustadt, P.C.

(57) ABSTRACT

A second material is fastened to a first material by a tapping screw having a male thread. The first material includes a hole and a concave portion around the hole. The hole has a surface in which a female thread is formed as the tapping screw is screwed in.

8 Claims, 2 Drawing Sheets

STRUCTURE FOR FASTENING BY SCREW

BACKGROUND OF THE INVENTION

1) Field of the Invention

The present invention relates to a structure for fastening by a screw, and more particularly to a structure for fastening thin plates made of, for example, metal, by the screw.

2) Description of the Related Art

FIG. 8 is a sectional view of a prepared hole (burring hole) formed by a conventional protruding method. In the case of a first material 24 having a thickness of 1.2 millimeter to 0.8 millimeter, a protruding height of 25 millimeter is secured by protruding the first material 24 using the conventional protruding method.

In a process of a rolled threading, if an ordinary tapping screw species 3 of a forming type, which is prescribed by JIS (Japanese Industrial Standard) is used, a tip 26 of the prepared hole widens as illustrated by dotted lines 27 in FIG. 8. Thus, it is impossible to secure a useful thread length, and results in a decrease in a failure torque of a female thread. Furthermore, a fastening performance is largely influenced by variations of a shear drop portion 28 in a screwing position, which is caused by the protruding method. Moreover, a great pressing power is required to perform a burring.

However, it has been believed impossible to apply a method of fastening by a screw to a thin metal sheet that is as thin as, for example, 0.6 millimeter, even if the burring is applied to the first material 24, if the tapping screw species 3 prescribed by JIS is used. In other words, it has been believed that fastening by a screw is impractical as the failure torque of the female thread is too low. The failure of the female thread of the burring type that uses the metal sheet having a thickness of 0.8 millimeter occurred in less than ten repeated fastenings, when the screw species 3 is fastened.

There is a method of fastening the thin metal sheets with a screw species 1 without burring. However, it is impossible to fasten repeatedly because an axial force is too low. The axial force is a force to press a second material to the first material. In other words, it is impossible to apply the method to a portion where securing of the axial force (a contact force) and prevention of loosening are required, from a viewpoint of safety rules, which are applied to all positions to be screwed in office automation apparatuses.

Meanwhile, in view of an environmental consideration, an increasing reference number of apparatuses has been recycled. Repeated usability of the screws is required for recycling. Moreover, energy saving effect is expected by reducing a weight of the apparatus.

A tapping screw of the forming type for the thin metal sheets that has a single-start thread at a lead portion and double-start threads at the useful thread portion is conceived as a screw that can fasten the thin metal sheets without the burring.

The tapping screw with the single-start thread and the double-start threads, however, is flawed for being low in axial force. The failure of the female thread can occur in an attempt to increase the fastening torque under a condition that the thread is relatively larger in diameter, and especially the thickness of the sheet metal is as thin as 0.6 millimeter.

SUMMARY OF THE INVENTION

It is an object of the present invention to at least solve the problems in the conventional technology.

A structure according to one aspect of the present invention is for fastening a second material to a first material by a tapping screw having a male thread. The first material includes a hole with a surface in which a female thread is formed as the tapping screw is screwed in; and a concave portion around the hole.

A structure according to another aspect of the present invention includes a first material having a first hole with a surface; and a concave portion around the first hole; a second material having a second hole; and a tapping screw to be inserted into the second hole and screwed in the first hole to form female thread on the surface of the first hole and to fasten the second material to the first material.

A method according to still another aspect of the present invention is a method for forming a first material that fastens a second material with a tapping screw having a male thread, the method includes forming a hole in the first material for screwing the tapping screw, wherein the hole has a surface in which a female thread is formed as the tapping screw is screwed in; and forming a concave portion in the first material around the hole.

The other objects, features and advantages of the present invention are specifically set forth in or will become apparent from the following detailed descriptions of the invention when read in conjunction with the accompanying drawings.

DETAILED DESCRIPTION

Exemplary embodiments of the arrangement according to the present invention will be explained below with reference to the accompanying drawings.

Figure 1:
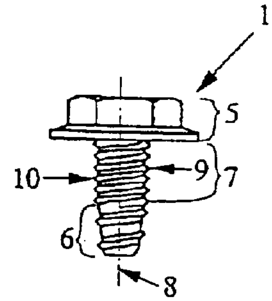
FIG. 1 is a side view of an example of a tapping screw for thin sheets that is used in embodiments of the present invention.

FIG. 1 is a side view of an example of a tapping screw 1 for a thin sheet (hereinafter, "tapping screw 1"), which is used in embodiments of the present invention. A head portion 5 has a cross recessed hexagon head with a captive washer, a lead portion 6 of a thread portion has a single-start thread, and a useful thread portion 7 has double-start threads. The double-start threads 9 and 10, in the useful thread portion 7, are symmetrical with respect to a center axis 8.

Therefore, direction of the tapping screw 1 is corrected so as to become a right angle with a second material when the useful thread portion 7 reaches the second material, even if the tapping screw 1 is tilted against the second material at first, because resistance of one side increases. In addition, the tapping screw 1 easily traces the threads previously made because the lead portion 6 has single-start threads, this is considered to function extremely effectively in a repeated fastening.

Figure 2:
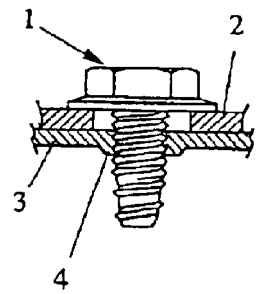
FIG. 2 is a sectional view of an embodiment of the present invention.

FIG. 2 is a sectional view of an embodiment of the tapping screw 1 shown in FIG. 1, which fastens a first material and a second material. According to this embodiment, the tapping screw 1 fastens a second material 2 with a first material 3. A concave portion 4 of the first material 3 is slightly deformed and being pressurized under a condition of being fastened due to an axial force of the tapping screw 1.

Figure 3:
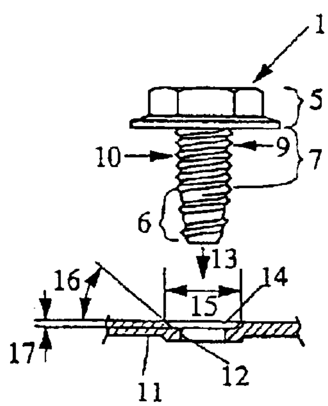
FIG. 3 is a sectional view of a concave portion of a peripheral of a prepared hole of an embodiment of the present invention, thicknesses of first materials thereof are 0.6 millimeter or 0.8 millimeter.

FIG. 3 is a sectional view of a concave portion in a periphery of a prepared hole of a first material 11 thicknesses thereof is 0.6 millimeter or 0.8 millimeter. In a periphery of a prepared hole 12 for a female thread on the first material 11, a concave portion 14 is formed by a drawing work. The concave portion 14 is trapezoid in shape, and an inlet of a thread is wider when viewed from a direction shown by an arrow 13. A diameter 15 of the concave portion 14 at the bottom is larger than a maximum outer diameter of the threaded portion of the tapping screw 1 by 0.5 millimeter to 0.2 millimeter. An angle of inclination of an inclined surface 16 of the concave portion 14 is about 45°±15°, and a depth of the drawing 17 is set to be from ¼ to ½ of a thickness of the first material 11. The prepared hole 12 is formed before the concave portion 14 is formed.

Figure 4:
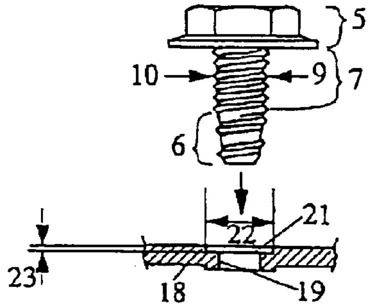
FIG. 4 is a sectional view of a concave portion of the peripheral of the prepared hole of the embodiment of the present invention, thicknesses of the first material thereof is 1.0 millimeter.

FIG. 4 is a sectional view of a concave portion of a peripheral of a prepared hole when a thickness of a first material 18 is 1.0 millimeter. In a periphery of a prepared hole 19 for a female thread, which is provided on a first material 18, a concave portion 21 is formed by a half blanking work. The direction of the half blanking work is the same as screwing direction 20 of the tapping screw 1. A diameter 22 of the concave portion 21 is larger than a maximum outer diameter of the threaded portion of the tapping screw 1 by 0.5 millimeter to 0.2 millimeter same as an example of FIG. 3, and a depth of the half blanking 23 is set to be ¼ to ½ of a thickness of the first material 18.

The diameters and depths of the concave portions 14 and 21 in the both FIGS. 3 and 4 are determined from a viewpoint of being able to secure a flexural strength due to the shape effect of the prepared holes, and also being able to conduct the works easily. Furthermore, choices of a drawing work or the half blanking are determined from viewpoints of easiness of the work and securing of strength depending on the thicknesses of the first materials 11 and 18. Moreover, the drawing and the half blanking require less pressing power than a burring.

Figure 5:
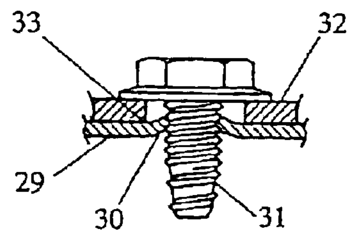
FIG. 5 is an example, for comparison, of a sectional view when a flat thin sheet, which has no concave portion, is fastened.

FIG. 5 is for a purpose of comparison, and is a sectional view of a flat first material 29 being fastened and the material is provided with no concave portion. A periphery of a female thread 30 of the flat first material 29 is deformed because a flexural moment, a fulcrum thereof is an edge of a hole 33 on a material 32 to be fastened, works by an axial force of a tapping screw 31. The deformation by the flexural stress is a major cause of the failure of the female thread. In contrast with FIG. 5, in the both examples of FIGS. 3 and 4, the peripheries of the prepared holes 12 and 19 are resistant to the flexural stress, and the failure of the female thread is satisfactory prevented from occurring.

Figure 6:
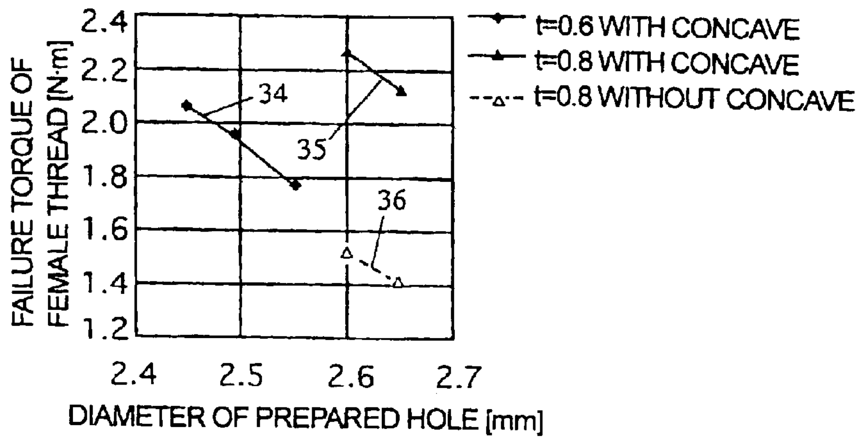
FIG. 6 shows effects of existence of the concave, which is used in embodiments of the present invention, on a failure torque of a female thread.

FIG. 6 shows effects of the existence of the concave portion, which is explained as embodiments of this invention, on the failure torque of the female thread. FIG. 6 shows a result of measurements of the failure torque of the female thread when a nominal 3 millimeter in diameter tapping screw (not shown) is used. In FIG. 6, a reference number 34 indicates a failure torque characteristics of a female thread when a 0.6 millimeter thick first material with a concave is used. In the case of a 0.6 millimeter thick first material without a concave, a failure of female thread occurred when fastened by a fastening torque of 11 kgf·cm (1.07 N·m), the failure torque in this case is presumed to be less than 1.1 N·m). The existence of the concave contributed to an improvement of performance of a failure of female thread by approximately 87% to 62% under a diameter of the prepared holes measured in this experiment.

In FIG. 6, a reference number 35 indicates a failure torque characteristics of a female thread when a 0.8 millimeter thick first material with a concave is used, and a reference number 36 indicates a failure torque characteristics of a female thread when a 0.8 millimeter thick first material without a concave is used. Each diameter of the prepared hole shows an improvement of about 50% of the performance.

Incidentally, the failure of the female thread occurs due to a lack of flexural strength of the female thread as a distance between an edge of the female thread and a portion to be pressed of the second material increases. In the case the thickness of the sheet is 0.6 millimeter, when a prepared hole of 3.5 millimeters (diameter)×5 millimeters (depth) is used, under a fastening torque of 1.1 N·m failures of the female thread occurred frequently without the concave, while no failure of the female thread occurred with the concave.

Figure 7:
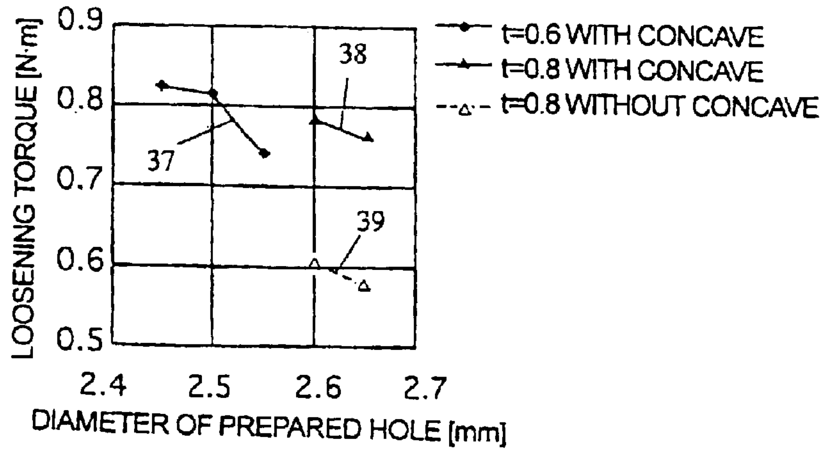
FIG. 7 shows effects of existence of the concave, which is used in embodiments of the present invention, on a loosening torque of the female thread.
Figure 8:
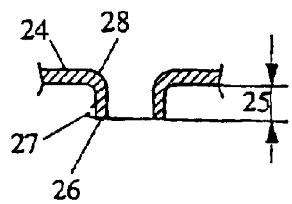
FIG. 8 is a sectional view of the prepared hole in a conventional protruding method.

FIG. 7 shows effects of the existence of the concave portion, which is explained as embodiments of this invention, on the loosening torque of the female thread. FIG. 7 shows a result of measurements of the loosening torque of the female thread when a nominal 3 millimeter diameter tapping screw (not shown) is used.

In FIG. 7, a reference number 37 indicates loosening torque characteristics of the female thread when a 0.6 millimeter thick first material with a concave is used. In the case of the 0.6 millimeter thick first material without a concave, no measurement was possible because a failure of the female thread occurred, which means the loosening torque is zero. In FIG. 7, a reference number 38 indicates loosening torque characteristics of the female thread when a 0.8 millimeter thick first material with a concave is used, and a reference number 39 indicates loosening torque characteristics of the female thread when a 0.8 millimeter thick first material without a concave is used.

As is clear from the results of the experiments, an improvement of approximately 30% of a loosening torque performance is seen under a diameter of the prepared holes measured in this experiment. The reason for this may be deformations at the concaves 14 and 21 function and prevent loosening of the tapping screws same as conical washers.

Incidentally, in the case the thickness of the female thread is 0.8 millimeter, an average failure torque of the female thread was 1.4 2 N·m without the concave, and the average failure torque of the female thread was 2.14 N·m with the concave, and loosening torque performance has improved by about 30% with the concave. In the case when the thickness of the sheet was 0.8 millimeter, an average loosening torque was 0.58 N·m without the concave, and was 0.77 N·m with the concave.

Thus, it has become possible to apply a 0.6 millimeter thick steel sheet to a portion where an axial force is required, which is impossible to apply before, because fastening the steel sheet by a screw is impossible. As a result, it has become possible to replace a 0.8 millimeter thick sheet by a 0.6 millimeter thick sheet. This has made not only a large cost cutting but also energy saving possible. Moreover, even the thickness of the sheet is 0.6 millimeter, the failure torque of the female thread and repeated fastening performances have improved drastically, and also reusability has improved compared with those of 0.8 millimeter thick sheet and burring combination.

Furthermore, when 0.8 millimeter thick sheet is used, by a change from parts made by burring to parts made by methods of this invention, a production method is changed from burring to half blanking. Thus, a pressing power is reduced, machinability improves, and repeated fastening performances improve drastically. Moreover, in the case a 1.0 millimeter thick sheet, it has become possible to fasten the sheet by merely drilling the sheet instead of burring as before. If a higher failure torque of the female thread is required, the machinability improves by applying the half blanking.

In other words, if the second material is thin, a bite of imperfect part of a male thread to the female thread is reduced, which enables the first material to fasten without the burring in the female thread. Thus, it is possible to make a good use of characteristics of the forming type tapping screw, for the thin metal sheet, a lead portion thereof is of single-start thread and a useful thread thereof is of double-start threads. Needless to say, same effects can be obtained when other types of tapping screws are used. The second material is not limited to metal, but any other material including plastics.

As explained above, a structure for fastening metal sheets by a screw related to the present invention has effects of being possible of fastening with a secured axial force of the screw and of improving a loosening prevention performance.

The present document incorporates by reference the entire contents of Japanese priority documents, 2002-266964 filed in Japan on Sep. 12, 2002 and 2003-203482 filed in Japan on Jul. 30, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A structure comprising:

a first material comprising a single plate having top and bottom surfaces, the top and bottom surfaces defining a hole with a surface to be threaded therebetween and defining a concave portion and a convex portion surrounding the hole and having diameters larger than the hole, the concave portion defined in the top surface, the convex portion defined in the bottom surface, the plate having a thickness of 1 millimeter or less adjacent the concave portion, and the convex portion extending a depth of at most one half the thickness of the plate;

a second material contacting the top surface of the first material such that a hole defined in the second material is aligned with the hole, the concave portion, and the convex portion in the first material; and a tapping screw disposed through the holes, the concave portion, and the convex portion in the first and second materials to connect the first and second materials, a threaded portion of the tapping screw cooperating with a threaded surface of the first material that is tapped with the tapping screw, and a head of the tapping screw contacting the second material.

2. The structure according to claim 1, wherein the diameter of a bottom of the concave portion is larger by 0.1 millimeter to 0.5 millimeter than an outer diameter of the tapping screw.

3. The structure according to claim 1, wherein a depth of the concave portion is from ¼ to ½ of the thickness of the plate.

4. The structure according to claim 1, wherein the concave portion comprises a trapezoidal shape, and the diameter of a portion of the concave portion adjacent the top surface is greater than the diameter of a portion of the concave portion adjacent the bottom surface.

5. A method of forming a structure, comprising:

forming in a first material a through hole and a concave portion on a top surface of the first material, the first material comprising a single plate and having a thickness adjacent the concave portion, and the convex portion extending a depth of at most one half the thickness of the first material;

contacting a second material with the top surface of the first material such that a through hole defined in the second material is aligned with the through hole and the concave portion in the first material; and connecting the first and second materials by disposing a tapping screw through the concave portion and the through holes of the first and second materials such that a head of the tapping screw contacts the second material.

6. The method according to claim 5, wherein the concave portion is formed by half blanking.

7. The method according to claim 5, further comprising:

tapping with a threaded portion of the tapping screw a surface of the first material that defines the hole.

8. The method according to claim 5, wherein the concave portion is formed surrounding the through hole in the first material.

* * * * *